United States Patent
Lu

(10) Patent No.: US 10,038,984 B1
(45) Date of Patent: Jul. 31, 2018

(54) WIRELESS POSITIONING METHOD AND WIRELESS POSITIONING DEVICE IN INDOOR ENVIRONMENT

(71) Applicant: U-MEDIA Communications, Inc., Hsinchu (TW)

(72) Inventor: Gang-Heng Lu, Hsinchu (TW)

(73) Assignee: U-MEDIA Communications, Inc., Hsinchu (TW)

(*) Notice: Subject to any disclaimer, the term of this patent is extended or adjusted under 35 U.S.C. 154(b) by 0 days.

(21) Appl. No.: 15/622,174

(22) Filed: Jun. 14, 2017

(30) Foreign Application Priority Data

Mar. 13, 2017 (TW) .............................. 106108176 A

(51) Int. Cl.
| | |
|---|---|
| H04W 24/00 | (2009.01) |
| H04W 4/04 | (2009.01) |
| G01S 5/02 | (2010.01) |
| H04W 64/00 | (2009.01) |

(52) U.S. Cl.
CPC ............. *H04W 4/04* (2013.01); *G01S 5/0252* (2013.01); *H04W 64/003* (2013.01)

(58) Field of Classification Search
CPC ....................................................... H04W 4/04
See application file for complete search history.

(56) References Cited

U.S. PATENT DOCUMENTS

| | | | |
|---|---|---|---|
| 2016/0238690 A1* | 8/2016 | Colucci | ...................... G01S 1/68 |
| 2017/0188188 A1* | 6/2017 | Kang | ..................... H04W 4/021 |
| 2017/0371023 A1* | 12/2017 | Syrjarinne | ............ H04W 4/025 |

* cited by examiner

*Primary Examiner* — Justin Lee
(74) *Attorney, Agent, or Firm* — Winston Hsu

(57) ABSTRACT

Disclosed are a wireless positioning method and a wireless positioning device. When the wireless positioning device is off-line, the information relevant to at least one Wi-Fi access point, at least one Bluetooth access point and at least one reference point is stored. When the wireless positioning device is on-line, the target position of the wireless positioning device is calculated according to the stored information.

10 Claims, 3 Drawing Sheets

RP1 r1=(x,y,MAC,RSS)=(1,0,00:90:4f:10:e4:62,-56)
r2=(x,y,MAC,RSS)=(1,0,00:90:4f:10:ff:ff,-55)
r3=(x,y,MAC,RSS)=(1,0,78:44:76:95:54:e4,-50)

RP2 r4=(2,1,00:90:4f:10:e4:62,-60)
r5=(2,1,00:90:4f:10:ff:ff,-46)
r6=(2,1,78:44:76:95:54:e4,-56)

RP3 r7=(2,3,00:90:4f:10:e4:62,-48)
r8=(2,3,00:90:4f:10:ff:ff,-50)

WIRELESS POSITIONING METHOD AND WIRELESS POSITIONING DEVICE IN INDOOR ENVIRONMENT

BACKGROUND OF THE INVENTION

1. Field of the Invention

The present disclosure relates to a wireless positioning method and a wireless positioning device; in particular, to a wireless positioning method and a wireless positioning device used within an indoor environment.

2. Description of Related Art

Generally, to position an electronic device in an indoor environment, the calculation for positioning the electronic device is based on the information relevant to signals from a plurality of Wi-Fi access points within the indoor environment. However, since the Wi-Fi signal coverage is large, it may not be precise to position an electronic device in an indoor environment based on the information relevant to the signals from the Wi-Fi access points. Also, the calculation for positioning the electronic device is complex. Thus, in this case, it may take much time to position an electronic device in an indoor environment and the positioning result may be not as precise as expected.

Alternatively, the calculation for positioning the electronic device can be based on the information relevant to signals from a plurality of Bluetooth access points within the indoor environment. However, compared with a Wi-Fi access point, the signal from a Bluetooth access point is weaker and unstable. Thus, in this case, a large number of Bluetooth access points should be configured in this indoor environment for positioning an electronic device, which is costly to achieve.

Thus, it is necessary to provide a way of precisely positioning an electronic device within an indoor environment with a limited number of physical access points.

SUMMARY OF THE INVENTION

The present disclosure provides a wireless positioning method and a wireless positioning device used in an indoor environment. In the present disclosure, the wireless positioning device is positioned by using at least one Wi-Fi access point, at least one Bluetooth access point and at least one reference point within the indoor environment.

The wireless positioning method provided by the present disclosure is applied to a wireless positioning device, for positioning the wireless positioning device within an indoor environment. This wireless positioning method includes: step 1: storing an access point position of at least one Wi-Fi access point and an access point position of at least one Bluetooth access point within the indoor environment, and storing a reference position of at least one reference point within the indoor environment, a reference signal strength of a Wi-Fi signal received by the reference point from the Wi-Fi access point and/or a reference signal strength of a Bluetooth signal received by the reference point from the Bluetooth access point; step 2: detecting a Wi-Fi reception signal strength according to a signal strength of the Wi-Fi signal from the Wi-Fi access point, and detecting a Bluetooth reception signal strength according to a signal strength of the Bluetooth signal from the Bluetooth access point; step 3: determining whether the Bluetooth reception signal strength is larger than or equal to a predetermined strength; and step 4: choosing the reference point receiving the Bluetooth signal from the Bluetooth access point when the Bluetooth reception signal strength is larger than or equal to the predetermined strength, and calculating a target position of the wireless positioning device within the indoor environment according to the reference position of the chosen reference point, the reference signal strength corresponding to the chosen reference point and the Bluetooth reception signal strength.

The wireless positioning device provided by the present disclosure is for positioning itself within an indoor environment. This wireless positioning device includes a storage device, a signal receiver and a processor, and the processor is electrically connected to the storage device and the signal receiver. The storage device stores an access point position of at least one Wi-Fi access point and an access point position of at least one Bluetooth access point within the indoor environment, and stores a reference position of at least one reference point within the indoor environment, a reference signal strength of a Wi-Fi signal received by the reference point from the Wi-Fi access point and/or a reference signal strength of a Bluetooth signal received by the reference point from the Bluetooth access point. The signal receiver detects a Wi-Fi reception signal strength according to a signal strength of the Wi-Fi signal from the Wi-Fi access point, and detects a Bluetooth reception signal strength according to a signal strength of the Bluetooth signal from the Bluetooth access point. The processor determines whether the Bluetooth reception signal strength is larger than or equal to a predetermined strength. The processor chooses the reference point receiving the Bluetooth signal from the Bluetooth access point when the Bluetooth reception signal strength is larger than or equal to the predetermined strength. After that, the processor calculates a target position of the wireless positioning device within the indoor environment according to the reference position of the chosen reference point, the reference signal strength corresponding to the chosen reference point and the Bluetooth reception signal strength.

To sum up, in the present disclosure, when the wireless positioning device is off-line, the information relevant to at least one Wi-Fi access point, at least one Bluetooth access point and at least one reference point is stored, such as the access point position and the signal strength. When the wireless positioning device is on-line, the target position of the wireless positioning device can be calculated according to the stored information. In this manner, it is quicker to position the wireless positioning device. Additionally, even though the number of physical access points may be restricted because of a cost-aware policy, it can still be very precise to position the wireless positioning device in an indoor environment by further using virtual access points.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

Figure 1:
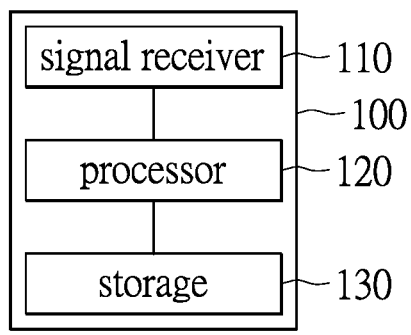
FIG. 1 shows a schematic diagram of a wireless positioning device for positioning itself within an indoor environment according to one embodiment of the present disclosure.
Figure 2:
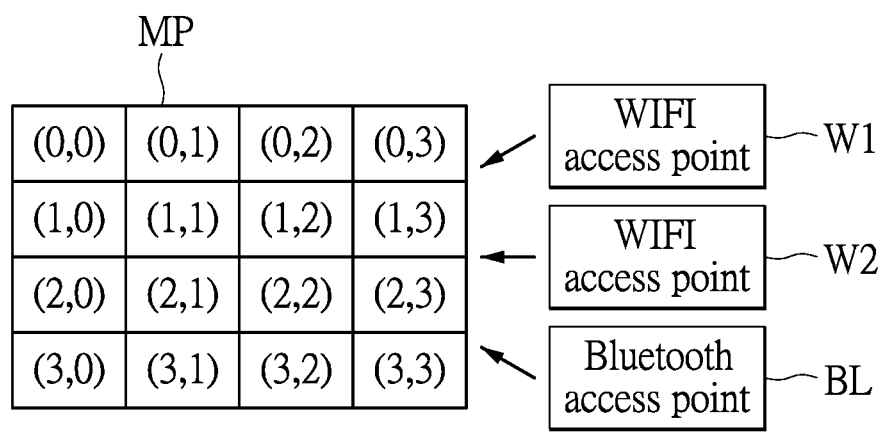
FIG. 2 shows a relationship between the Wi-Fi access points and the coordinate map and shows a relationship between Bluetooth access points and the coordinate map according to one embodiment of the present disclosure.

Referring to FIG. 1, a schematic diagram of a wireless positioning device for positioning itself within an indoor environment in one embodiment of the present disclosure is shown. The wireless positioning device 100 is used for positioning itself within an indoor environment. When a user walks in an indoor environment with the wireless positioning device 100, the wireless positioning device 100 can calculate its position coordinate within this indoor environment through at least one Wi-Fi access point (which is a physical access point), at least one Bluetooth access point (which is a physical access point) and at least one reference point. FIG. 2 shows a relationship between the Wi-Fi access points and the coordinate map and a relationship between Bluetooth access points and the coordinate map in one embodiment of the present disclosure. For example, in FIG. 2, the coordinate map MP is defined by 16 position coordinates including (0,0), (0,1), (0,2), (0,3), (1,0), (1,1), (1,2), (1,3), (2,0), (2,1), (2,2), (2,3), (3,0), (3,1), (3,2) and (3,3). Two Wi-Fi access points W1 and W2 and one Bluetooth access point BL are configured respectively at one of the position coordinates from (0, 0) to (3, 3). The wireless positioning device 100 can calculate its position coordinate in the coordinate map MP. In this embodiment, the wireless positioning device 100 can be, for example, a smart phone, a laptop, a smart watch or other electronic devices having a memory and can make calculations.

Figure 3:
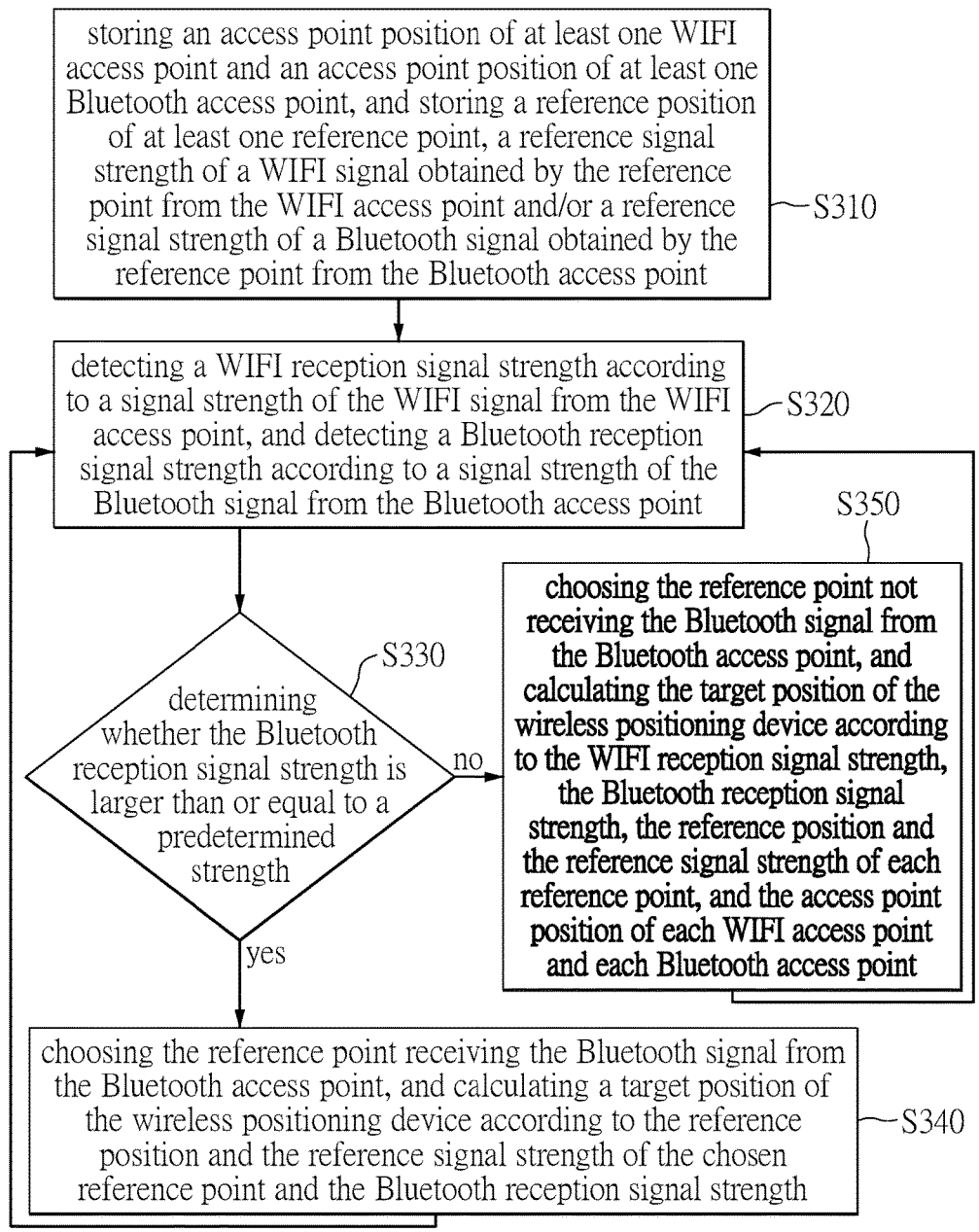
FIG. 3 shows a flow chart of a wireless positioning method for positioning a wireless positioning device within an indoor environment according to one embodiment of the present disclosure.

Referring to FIG. 1 and FIG. 3, the wireless positioning device 100 includes a storage device 130, a signal receiver 110 and a processor 120. The storage device 130 stores an access point position of at least one Wi-Fi access point W1 and W2 and an access point position of at least one Bluetooth access point BL. For example, the Wi-Fi access points W1 and W2 and the Bluetooth access point BL can be configured respectively at one of the 16 position coordinates from (0,0) to (3,3) in the coordinate map MP. Besides, the Wi-Fi access points W1 and W2 and the Bluetooth access point BL are configured at different position coordinates, such as (0,0), (0,3) and (3,1).

When the wireless positioning device 100 is off-line, the position coordinates of the Wi-Fi access points W1 and W2 in the coordinate map MP are recorded, such as (0,0) and (0,3). Also, the position coordinates of the Bluetooth access point BL in the coordinate map MP is recorded, such as (3, 1).

The storage device 130 stores a reference position of at least one reference point (not shown), a reference signal strength of a Wi-Fi signal received by the reference point from each of the Wi-Fi access points W1 and W2 and/or a reference signal strength of a Bluetooth signal received by the reference point from the Bluetooth access point BL. In this embodiment, the reference position of the reference point is generated randomly. For example, there are three reference points configured respectively at one of the 16 position coordinates from (0, 0) to (3, 3) in the coordinate map MP. Also, the position coordinates of the Wi-Fi access points W1 and W2, the Bluetooth access point BL and the three reference points are different, and thus the three reference points can be, for example, at (1, 0), (2, 1) and (2, 3).

When the wireless positioning device 100 is off-line, the position coordinates of the three virtual access points in the coordinate map MP, such as (1, 0), (2, 1) and (2, 3), are recorded. In addition, the reference signal strengths of Wi-Fi signals received by the reference point from the Wi-Fi access points W1 and W2 and/or a reference signal strength of a Bluetooth signal received by the reference point from the Bluetooth access point BL are recorded. For example, the reference signal strengths of Wi-Fi signals received by the reference point from the Wi-Fi access points W1 and W2, and the reference signal strength of a Bluetooth signal received by the reference point from the Bluetooth access point BL are recorded as −56 dbm, −55 dbm and −50 dbm.

The wireless positioning device 100 can face toward several directions, such as the East and the West. For each direction, the storage device 130 stores reference signal strengths of Wi-Fi signals received by the reference point from the Wi-Fi access points W1 and W2 and/or the reference signal strength of a Bluetooth signal received by the reference point from the Bluetooth access point BL. For example, when the first reference point faces the first direction, reference signal strengths of Wi-Fi signals received by the reference point from the Wi-Fi access points W1 and W2, and the reference signal strength of a Bluetooth signal received by the reference point from the Bluetooth access point BL are recorded as −56 dbm, −55 dbm and −50 dbm, but when the first reference point faces the second direction, reference signal strengths of Wi-Fi signals received by the reference point from the Wi-Fi access points W1 and W2, and the reference signal strength of a Bluetooth signal received by the reference point from the Bluetooth access point BL are recorded as −35 dbm, −43 dbm and −31 dbm. It should be noted that, the number of directions that the wireless positioning device 100 can face toward is not restricted.

After the storage device 130 obtains the above information relevant to the Wi-Fi access points W1 and W2, the Bluetooth access point BL and the reference points the off-line setting for the wireless positioning device 100 is finished. In this embodiment, preferably, the storage device 130 is a non-volatile memory chip.

The signal receiver 110 detects a Wi-Fi reception signal strength according to the signal strength of a Wi-Fi signal from each of the Wi-Fi access points W1 and W2, and detects a Bluetooth reception signal strength according to a signal strength of the Bluetooth signal from the Bluetooth access point BL. For example, when a user takes the wireless positioning device 100 to the position coordinate (3, 0), according to signal strengths of the Wi-Fi signals from the Wi-Fi access points W1 and W2, the wireless positioning device 100 detects Wi-Fi reception signal strengths corresponding to the Wi-Fi access points W1 and W2, such as −50 dbm and −100 dbm; and according to a signal strength of the Bluetooth signal from the Bluetooth access point BL, the wireless positioning device 100 detects a Bluetooth reception signal strength, such as −45 dbm. After that, the detected Wi-Fi reception signal strengths and the detected Bluetooth reception signal strength are provided to the processor 120 for calculating a target position of the wireless positioning device 100 within the indoor environment.

The processor 120 is electrically connected to the storage device 130 and the signal receiver 110. The processor 120 determines whether the detected Bluetooth reception signal strength is larger than or equal to a predetermined strength. If the detected Bluetooth reception signal strength is larger than or equal to the predetermined strength, it indicates that a Bluetooth access point BL is near the wireless positioning device 100. In this case, the processor 120 chooses the reference point receiving the Bluetooth signal from the Bluetooth access point, and calculates a target position of the wireless positioning device 100 according to the reference position of the chosen reference point, the reference signal strength corresponding to the chosen reference point and the Bluetooth reception signal strength. After that, the signal receiver 110 again detects the Wi-Fi reception signal strength of a Wi-Fi signal from each of the Wi-Fi access points W1 and W2 and again detects the Bluetooth reception signal strength of a Bluetooth signal from each of the Bluetooth access point BL. Then, the processor 120 can accordingly calculate the target position of the wireless positioning device 100 within the indoor environment at the next time point.

Figures 4, 5:
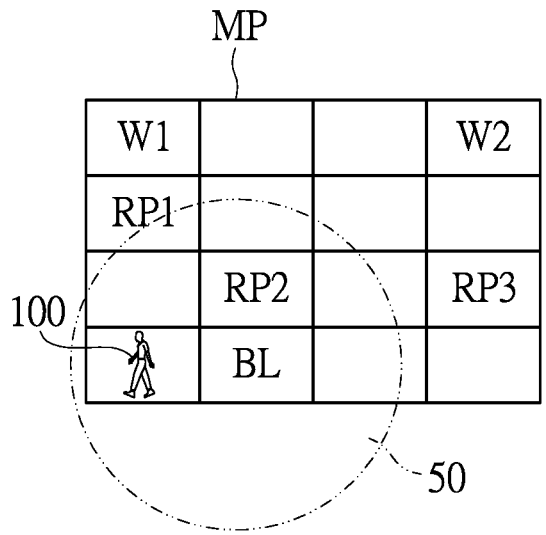
FIG. 4 shows relationships between the coordinate map and the Wi-Fi access points, the Bluetooth access points, and the reference points according to one embodiment of the present disclosure.
FIG. 5 shows a schematic diagram of the information relevant to the reference point according to one embodiment of the present disclosure

As shown in FIG. 4, the Wi-Fi access points W1 and W2 are configured respectively at the position coordinates (0, 0) and (0, 3) in the coordinate map MP, and the signal strength of a Wi-Fi signal from the Wi-Fi access points W1 and W2 are −1 dbm and −3 dbm. In addition, the Bluetooth access point BL is configured at the position coordinate (3, 1) in the coordinate map MP, and the signal strength of a Bluetooth signal from the Bluetooth access point BL is −2 dbm.

In FIG. 4, the three reference points RP1, RP2 and RP3 are configured respectively at position coordinates (1, 0), (2, 1) and (2, 3) in the coordinate map MP. The reference signal strength of a Wi-Fi signal received by the reference point RP1 from the Wi-Fi access point W1 is −56 dbm, the reference signal strength of a Wi-Fi signal received by the reference point RP1 from the Wi-Fi access point W2 is −55 dbm, and the reference signal strength of a Bluetooth signal received by the reference point RP1 from the Bluetooth access point BL is −50 dbm.

The reference signal strength of a Wi-Fi signal received by the reference point RP2 from the Wi-Fi access point W1 is −60 dbm, the reference signal strength of a Wi-Fi signal received by the reference point RP2 from the Wi-Fi access point W2 is −46 dbm, and the reference signal strength of a Bluetooth signal received by the reference point RP2 from the Bluetooth access point BL is −56 dbm.

The reference signal strength of a Wi-Fi signal received by the reference point RP3 from the Wi-Fi access point W1 is −48 dbm, the reference signal strength of a Wi-Fi signal received by the reference point RP3 from the Wi-Fi access point W2 is −50 dbm, but the reference point RP3 does not receive a Bluetooth signal from the Bluetooth access point BL.

The information relevant to the Wi-Fi access point W1, the Wi-Fi access point W2, the Bluetooth access point BL and the reference points RP1, RP2 and RP3 are recorded by the storage device 130 when the storage device is off-line. Specifically, the storage device 130 records the information relevant to the reference points RP1, RP2 and RP3 as an access point list, wherein the access point lists of the reference points RP1, RP2 and RP3 are written in a format (x, y, MAC, RSS). "x" and "y" represent for the position coordinate of the reference point, "MAC" represents for the media access control address of the Wi-Fi access points W1 and W2 or the Bluetooth access point BL, and "RSS" represents for the reference signal strength of a Wi-Fi signal received by the reference point from the Wi-Fi access points W1 and W1 and/or the reference signal strength of a Bluetooth signal received by the reference point from the Bluetooth access point BL. The access point lists r1, r2, r3, r4, r5, r6, r7 and r8 of the reference points RP1, RP2 and RP3 are shown in FIG. 5.

As shown in FIG. 5, the reference point RP1 receives Wi-Fi signals from the Wi-Fi access points W1 and W2 and/or a Bluetooth signal from the Bluetooth access point BL. Thus, the information relevant to the reference point RP1 can be recorded as three access point lists r1~r3, and the access point lists r1~r3 respectively correspond to the signals received by the reference point RP1 from the Wi-Fi access points W1 and W2 and from the Bluetooth access point BL.

In FIG. 5, the access point list r1 is (1,0,00:90:4f10:e4: 62,−56). This indicates that, the position coordinate of the reference point RP1 is (1,0), the media access control address MAC of the Wi-Fi access point W1 is 00:90:4f:10: e4:62, and the reference signal strength of the signal received by the reference point RP1 from the Wi-Fi access point W1 is −56 dbm. Similarly, the information relevant to the reference point RP2 can be recorded as three access point lists r4~r6, and the access point lists r4~r6 respectively correspond to the signals received by the reference point RP2 from the Wi-Fi access points W1 and W2 and from the Bluetooth access point BL. However, the reference point RP3 does not receive any signal from the Bluetooth access point BL, and thus the information relevant to the reference point RP3 is only recorded as two access point lists r7~r8, and the access point lists r7~r8 respectively correspond to the signals received by the reference point RP3 from the Wi-Fi access points W1 and W2.

Referring again to FIG. 4, when the user takes the wireless positioning device 100 to the position coordinate (3, 0), the user is within a Bluetooth signal coverage 50 of the Bluetooth access point BL. In this case, the processor 120 chooses the reference points RP1 and RP2 which receive a signal from the Bluetooth access point BL. Then, the processor 120 calculates the target position (3, 0) of the wireless positioning device 100 in the coordinate map MP according to the information relevant to the reference points RP1 and RP2, which is recorded as the access point lists r1~r3 and the access point lists r4~r6. The information relevant to the reference points RP1 and RP2 includes the reference positions of the reference points RP1 and RP2, the reference signal strength of signals received by the reference points RP1 and RP2 from the Bluetooth access point BL, and the Bluetooth reception signal strength of the Bluetooth access point BL. Specifically, the processor 120 calculates the target position (3, 0) of the wireless positioning device 100 by using the proximity-based positioning algorithm, but is not limited thereto.

When the processor 120 determines that the Bluetooth reception signal strength is smaller than the predetermined strength, the processor 120 calculates the target position of the wireless positioning device 100 within the indoor environment according to the Wi-Fi reception signal strengths, the Bluetooth reception signal strength, the reference position of each reference point the reference signal strengths of the signals received by each reference point from the Wi-Fi access points W1 and W2 and from the Bluetooth access point BL, and the access point positions of each Wi-Fi access point and each Bluetooth access point. After the processor 120 obtains the target position of the wireless positioning device 100, the signal receiver 110 again detects the Wi-Fi reception signal strength according to signals from the Wi-Fi access points W1 and W2, and again detects the Bluetooth reception signal strength according to a signal from the Bluetooth access point BL, so that the processor 120 can accordingly calculate the target position of the wireless positioning device 100 within the indoor environment at the next time point.

Again referring to FIG. 4, when the user takes the wireless positioning device 100 to the position coordinate (0, 2), the processor 120 determines whether the Bluetooth reception signal strength is larger than or equal to the predetermined strength. When the Bluetooth reception signal strength is smaller than the predetermined strength, the processor 120 calculates the target position (0, 2) of the wireless positioning device 100 in the coordinate map MP according to the information relevant to the reference points RP1~RP3, the access point positions (0, 0) and (0, 3) of the Wi-Fi access points W1 and W2, and the access point position (3, 1) of the Bluetooth access point BL. The information relevant to the reference points RP1~RP3 is recorded as the access point lists r1~r8, including the Wi-Fi reception signal strength, the Bluetooth reception signal strength, the reference position of each reference point RP1~RP3, and the reference signal strengths of signals received by the reference points RP1~RP3 from the Wi-Fi access points W1 and W2 and from the Bluetooth access point BL. Specifically, the processor 120 calculates the target position (0, 2) of the wireless positioning device 100 by using the Wi-Fi fingerprinting algorithm, but it is not limited thereto In conclusion, when the processor 120 determines that the Bluetooth reception signal strength is larger than or equal to the predetermined strength, it indicates that a Bluetooth access point BL is near the wireless positioning device 100. In this case, the processor 120 calculates the target position of the wireless positioning device 100 in the indoor environment according to the Bluetooth reception signal strength and the information relevant to each reference point that receives a signal from the Bluetooth access point BL, such as the reference points RP1 and RP2. On the other hand, when the processor 120 determines that the Bluetooth reception signal strength is smaller than the predetermined strength, it indicates that no Bluetooth access point BL is near the wireless positioning device 100. In this case, the processor 120 calculates the target position of the wireless positioning device 100 in the indoor environment according to the Wi-Fi reception signal strength, the Bluetooth reception signal strength, and the information relevant to all Wi-Fi access points W1 and W2, all Bluetooth access points BL, and all reference points RP1~RP3.

Briefly, in FIG. 4, when there is a Bluetooth access point BL near the wireless positioning device 100, the processor 120 can calculate the target position of the wireless positioning device 100 only according to the information relevant to each reference point that receives a signal from the Bluetooth access point BL, but not according to the information relevant to all physical access points including the Wi-Fi access points W1 and W2 and the Bluetooth access points BL. Therefore, it takes much less time to position the wireless positioning device 100. Moreover, even though the number of physical access points may be restricted because of cost-aware policies, the wireless positioning device 100 can still be precisely positioned by further using reference points, such as reference points RP1~RP3.

From the above embodiment of the wireless positioning device 100, a wireless positioning method used within an indoor environment can be derived. Referring to FIG. 3, a flow chart of a wireless positioning method for positioning a wireless positioning device within an indoor environment in one embodiment of the present disclosure is shown. This wireless positioning method includes steps as follows. In step S310, the storage device 130 of the wireless positioning device 100 stores an access point position of at least one Wi-Fi access point W1 and W2, and stores an access point position of at least one Bluetooth access point. In addition, the storage device 130 of the wireless positioning device 100 stores a reference position of at least one reference point RP1~RP3, a reference signal strength of a Wi-Fi signal received by each reference point reference point RP1~RP3 from the Wi-Fi access points W1 and W2 and/or a reference signal strength of a Bluetooth signal received by each reference point reference point RP1~RP3 from the Bluetooth access point BL.

In step S320, the signal receiver 110 of the wireless positioning device 100 detects a Wi-Fi reception signal strength according to a signal strength of the Wi-Fi signal from each of the Wi-Fi access points W1 and W2, and detects a Bluetooth reception signal strength according to a signal strength of the Bluetooth signal from the Bluetooth access point BL.

In step S330, the processor 120 of the wireless positioning device 100 determines whether the Bluetooth reception signal strength is larger than or equal to a predetermined strength. If the Bluetooth reception signal strength is larger than or equal to the predetermined strength, the method goes to step S340, but if the Bluetooth reception signal strength is smaller than the predetermined strength, the method goes to the step S350.

In step S340, the processor 120 of the wireless positioning device 100 chooses the reference points which receive a signal from the Bluetooth access point BL. Then, the processor 120 of the wireless positioning device 100 calculates the target position of the wireless positioning device 100 according to the Bluetooth reception signal strength, the reference positions of the chosen reference points, and the reference signal strengths of signals received by each chosen reference point from the Wi-Fi access points W1 and W2 and the Bluetooth access point BL. When step S340 is finished, the method returns to step S320.

In step S350, the processor 120 of the wireless positioning device 100 calculates the target position of the wireless positioning device 100 according to the Wi-Fi reception signal strength, the Bluetooth reception signal strength, the reference position of each reference point, the reference signal strengths of signals received by each reference point from the Wi-Fi access points W1 and W2 and the Bluetooth access point BL, and the access point positions of each of the Wi-Fi access points W1 and W2 and each Bluetooth access point BL. When step S350 is finished, the method returns to step S320.

To sum up, in present disclosure, when the wireless positioning device is off-line, the information relevant to at least one Wi-Fi access point, at least one Bluetooth access point and at least one reference point, such as the access point position and the signal strength, is stored. When the wireless positioning device is on-line, the target position of the wireless positioning device can be calculated according to the stored information. In this manner, it is quicker to position the wireless positioning device. Additionally, even though the number of physical access points may be restricted because of cost-aware policies, the wireless positioning device can still be precisely positioned by further using reference points.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A wireless positioning method applied to a wireless positioning device, for positioning the wireless positioning device within an indoor environment, comprising:
    step 1: storing an access point position of at least one Wi-Fi access point and an access point position of at least one Bluetooth access point within the indoor environment, and storing a reference position of at least one reference point within the indoor environment, a reference signal strength of a Wi-Fi signal received by the reference point from the Wi-Fi access point and/or a reference signal strength of a Bluetooth signal received by the reference point from the Bluetooth access point;
    step 2: detecting a Wi-Fi reception signal strength according to a signal strength of the Wi-Fi signal from the Wi-Fi access point, and detecting a Bluetooth reception signal strength according to a signal strength of the Bluetooth signal from the Bluetooth access point;
    step 3: determining whether the Bluetooth reception signal strength is larger than or equal to a predetermined strength; and
    step 4: choosing the reference point receiving the Bluetooth signal from the Bluetooth access point when the Bluetooth reception signal strength is larger than or equal to the predetermined strength, and calculating a target position of the wireless positioning device within the indoor environment according to the reference position of the chosen reference point, the reference signal strength corresponding to the chosen reference point and the Bluetooth reception signal strength.

2. The wireless positioning method according to claim 1, wherein after the step of determining whether the Bluetooth reception signal strength is larger than or equal to the predetermined strength, if the Bluetooth reception signal strength is smaller than the predetermined strength, a reference point not receiving the Bluetooth signal from the Bluetooth access point is chosen, and the target position of the wireless positioning device within the indoor environment is calculated according to the Wi-Fi reception signal strength, the Bluetooth reception signal strength, the reference position of each reference point, the reference signal strength corresponding to each reference point, and the access point position of each Wi-Fi access point and each Bluetooth access point.

3. The wireless positioning method according to claim 1, wherein a coordinate map is generated for the indoor environment, the coordinate map is defined by a plurality of position coordinates, the access point position of the Wi-Fi access point or the Bluetooth access point, the reference position of the reference point and the target position of the wireless positioning device are at one of the position coordinates, and the access point position of the Wi-Fi access point or the Bluetooth access point and the reference position of the reference point are at different position coordinates.

4. The wireless positioning method according to claim 1, wherein the step 2 is again executed after the step 4 is finished.

5. The wireless positioning method according to claim 1, wherein the wireless positioning device faces toward a plurality of directions and the step 1 further includes:
    storing the reference signal strength of the Wi-Fi signal received by the reference point from the Wi-Fi access point and/or the reference signal strength of the Bluetooth signal received by the reference point from the Bluetooth access point for each direction.

6. The wireless positioning method according to claim 1, wherein the reference position of the reference point is generated randomly.

7. A wireless positioning device used within an indoor environment, comprising:
    a storage device, storing an access point position of at least one Wi-Fi access point and an access point position of at least one Bluetooth access point within the indoor environment, and storing a reference position of at least one reference point within the indoor environment, a reference signal strength of a Wi-Fi signal received by the reference point from the Wi-Fi access point and/or a reference signal strength of a Bluetooth signal received by the reference point from the Bluetooth access point;
    a signal receiver, detecting a Wi-Fi reception signal strength according to a signal strength of the Wi-Fi signal from the Wi-Fi access point, and detecting a Bluetooth reception signal strength according to a signal strength of the Bluetooth signal from the Bluetooth access point; and
    a processor, electrically connected to the storage device and the signal receiver, and determining whether the Bluetooth reception signal strength is larger than or equal to a predetermined strength;
    wherein the processor chooses the reference point receiving the Bluetooth signal from the Bluetooth access point when the Bluetooth reception signal strength is larger than or equal to the predetermined strength, and calculates a target position of the wireless positioning device within the indoor environment according to the reference position of the chosen reference point, the reference signal strength corresponding to the chosen reference point and the Bluetooth reception signal strength.

8. The wireless positioning device according to claim 7, wherein if the Bluetooth reception signal strength is smaller than the predetermined strength, the processor calculates the target position of the wireless positioning device within the indoor environment according to the Wi-Fi reception signal strength, the Bluetooth reception signal strength, the reference position of each reference point, the reference signal strength corresponding to each reference point, and the access point positions of each Wi-Fi access point and each Bluetooth access point.

9. The wireless positioning device according to claim 7, wherein a coordinate map is generated for the indoor environment, the coordinate map is defined by a plurality of position coordinates, the access point position of the Wi-Fi access point or the Bluetooth access point, the reference position of the reference point and the target position of the wireless positioning device are respectively at one of the position coordinates, and the access point position of the Wi-Fi access point or the Bluetooth access point and the reference position of the reference point are at different position coordinates.

10. The wireless positioning device according to claim 7, wherein the wireless positioning device faces to a plurality of directions, the storage device stores the reference signal strength of the Wi-Fi signal received by the reference point from the Wi-Fi access point and/or the reference signal strength of the Bluetooth signal received by the reference point from the Bluetooth access point for each direction.

\* \* \* \* \*